United States Patent
Tervo

(10) Patent No.: US 7,174,392 B2
(45) Date of Patent: Feb. 6, 2007

(54) METHOD FOR VERIFYING TIME DATA, A SYSTEM AND A TERMINAL

(75) Inventor: Vesa Tervo, Tampere (FI)

(73) Assignee: Nokia Corporation, Espoo (FI)

( * ) Notice: Subject to any disclaimer, the term of this patent is extended or adjusted under 35 U.S.C. 154(b) by 602 days.

(21) Appl. No.: 10/184,185

(22) Filed: Jun. 26, 2002

(65) Prior Publication Data

US 2003/0041184 A1    Feb. 27, 2003

(30) Foreign Application Priority Data

Jun. 27, 2001 (FI) .................................. 20011377

(51) Int. Cl.
*G06F 15/13* (2006.01)

(52) U.S. Cl. ...................... 709/248; 713/178; 713/200; 713/201

(58) Field of Classification Search ................ 709/248; 713/178, 200, 201
See application file for complete search history.

(56) References Cited

U.S. PATENT DOCUMENTS

| | | | |
|---|---|---|---|
| 5,444,780 A | 8/1995 | Hartman, Jr. ................ 380/30 |
| 5,500,897 A | 3/1996 | Hartman, Jr. ................ 380/25 |
| 5,781,630 A | 7/1998 | Huber et al. ................. 380/23 |
| 5,923,763 A | 7/1999 | Walker et al. ................ 380/51 |
| 6,081,899 A * | 6/2000 | Byrd ........................ 713/201 |
| 6,209,090 B1 * | 3/2001 | Aisenberg et al. .......... 713/178 |
| 6,263,438 B1 * | 7/2001 | Walker et al. ............. 713/178 |
| 6,393,126 B1 * | 5/2002 | van der Kaay et al. ..... 380/241 |
| 6,728,880 B1 * | 4/2004 | Sites ........................ 713/178 |
| 6,742,048 B1 * | 5/2004 | Walsh ....................... 709/248 |
| 6,895,507 B1 * | 5/2005 | Teppler ..................... 713/200 |

FOREIGN PATENT DOCUMENTS

| | | |
|---|---|---|
| EP | 1022640 | 7/2000 |
| WO | WO 00/79348 A2 | 12/2000 |

* cited by examiner

*Primary Examiner*—John Follansbee
*Assistant Examiner*—Jinsong Hu

(57) ABSTRACT

The invention relates to a method for verifying time data in a terminal containing a real-time clock for maintaining time data. In the method certified time data is produced. Said certified time data is transmitted to the terminal and it is stored therein. In the method said certified time data is also compared with the time data of said real-time clock to check the reliability of the time data of the real-time clock.

11 Claims, 4 Drawing Sheets

METHOD FOR VERIFYING TIME DATA, A SYSTEM AND A TERMINAL

FIELD OF THE INVENTION

The present invention relates to a method for verifying time data in a terminal containing a real-time clock for maintaining time data. The invention also relates to a system comprising means for producing time data, means for transmitting time data to a terminal containing a real-time clock for maintaining time data in the terminal. The invention further relates to a terminal containing a real-time clock and means for receiving time data.

BACKGROUND OF THE INVENTION

Especially when electronic services become more common, a need has arisen to verify the transaction time of the electronic services. Systems have been developed for this purpose, in which time data is maintained and certified time data is transmitted to a terminal in which the time data is used for generating a time stamp of the events. Furthermore, this time data can be used for setting the real-time clock of the terminal itself to a time indicated by the time data. A problem in such a system is that the time data can be transmitted to the terminal only when the terminal is connected to such a communication network via which time data can be transmitted. In a situation in which the terminal is not connected to this communication network, time data is typically maintained by means of the real-time clock of the terminal itself. However, such a real-time clock of a terminal is not necessarily very accurate, wherein the time data in the real-time clock of the terminal is inaccurate already within a relatively short period of time. Moreover, the user may, if he/she so desires, change the time data in the real-time clock of the terminal, wherein the user can set the time data so that it is inaccurate and advantageous for the user himself/herself. Thus, the user may try to correct his/her own neglect by distorting the time for example in a situation where an electronic event should have been performed by a fixed term. Such a situation may occur for example when the user sends his/her tax return electronically, or a facsimile, an e-mail or any other electronic document after a deadline. Furthermore, by changing the time data in the real-time clock of the terminal the user may attempt to obtain more operating time for example for such programs which have a limited operating time, or for example when a limited usage time is set for a piece of music retrieved from a communication network to the terminal.

SUMMARY OF THE INVENTION

One purpose of the present invention is to bring about a method for verifying time data in such a manner that it is not possible for the user of the terminal to set the time data to a time earlier than the real time. The invention is based on the idea that certified time data is retrieved to the terminal, and the time data is stored in the terminal. Thus, in connection with such a situation where the time data has to be verified, a comparison is conducted between the real-time clock of the terminal and the stored, certified time data. If the comparison shows that the real-time clock of the terminal is behind the certified time data, it can be assumed that the real-time clock of the terminal does not show the accurate time, and attempts have probably been made to alter the time. To put it more precisely, the method according to the present invention is primarily characterized in that in the method, said certified time data is transmitted to the terminal, said certified time data is stored in the terminal and said certified time data is compared with the time data of said real-time clock to check the reliability of the time data of the real-time clock. The system according to the present invention is primarily characterized in that the system also comprises means for storing said certified time data in the terminal and means for comparing said certified time data with the time data of said real-time clock to check the reliability of the time data of the real-time clock. Furthermore, the terminal according to the present invention is primarily characterized in that the terminal also comprises means for storing said certified time data and means for comparing said certified time data with the time data of said real-time clock to check the reliability of the time data of the real-time clock.

The present invention shows remarkable advantages compared to solutions of prior art. When the method according to the invention is applied, it can be ensured in the terminal that the real time data cannot at least be earlier than the last stored, certified time data. Thus, it can be discovered if attempts have been made to change the internal time data of the terminal to a time earlier than the last stored time data. Thus, it is not possible to exceed the maximum times of use set for example for pieces of music. Furthermore, by means of the method according to the invention it can be ensured that the document transmitted by the user of the terminal was really transmitted at the time indicated by the time stamp, and that attempts have not been made to tamper with the time of transmission by changing the time data inside the terminal.

DESCRIPTION OF THE DRAWINGS

In the following, the invention will be described in more detail with reference to the appended drawings, in which.

DETAILED DESCRIPTION OF THE INVENTION

Figure 1:
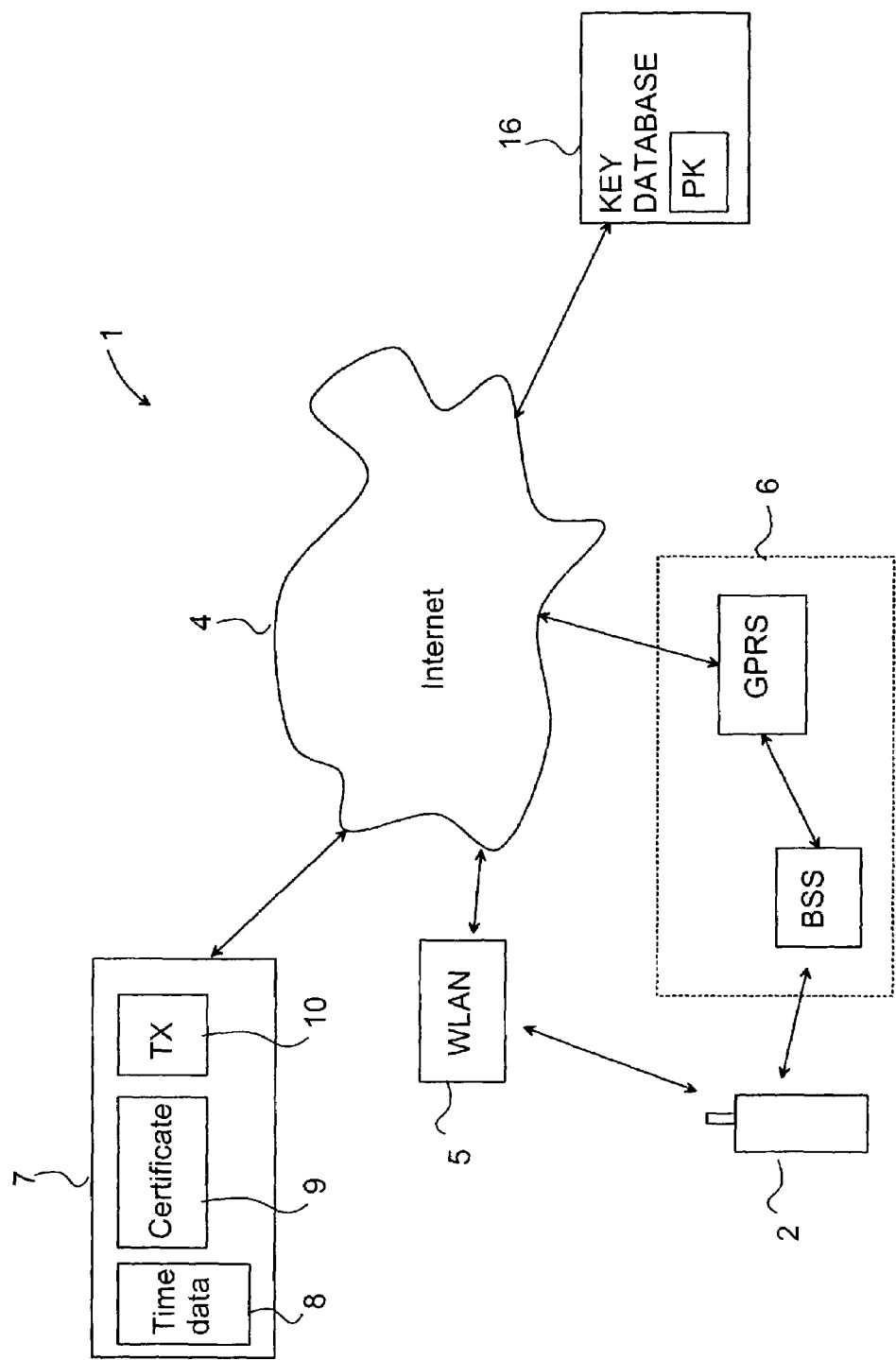
FIG. 1 shows a system according to a preferred embodiment of the invention in a simplified block diagram.

In FIG. 1, the system 1 according to a preferred embodiment of the invention comprises one or more terminals 2, which contain means 3 for maintaining time data. These means for maintaining time data advantageously comprise a real-time clock (RTC), or the like, which, in addition to the time, contains diurnal calendar functions. Furthermore, the system 1 comprises a communication network 4, such as the Internet network, a wireless local area network (WLAN) 5, a mobile communication network 6, etc. Moreover, the system 1 comprises a time data maintenance system 7, in which time data is maintained by means of one or more accurate clocks, such as an atom clock in a manner known as such. The time data maintenance system 7 comprises means 9 for verifying time data and communication means 10 by means of which time data can be transferred to the communication network 4 to be transmitted to the terminals 2 requiring the time data. Although in FIG. 1 the time data maintenance system 7 is connected to the communication network 4, the time data maintenance system 7 can also be coupled to a data transmission connection for example directly to the communication network 6 and/or the wireless local area network 5.

Figure 2:
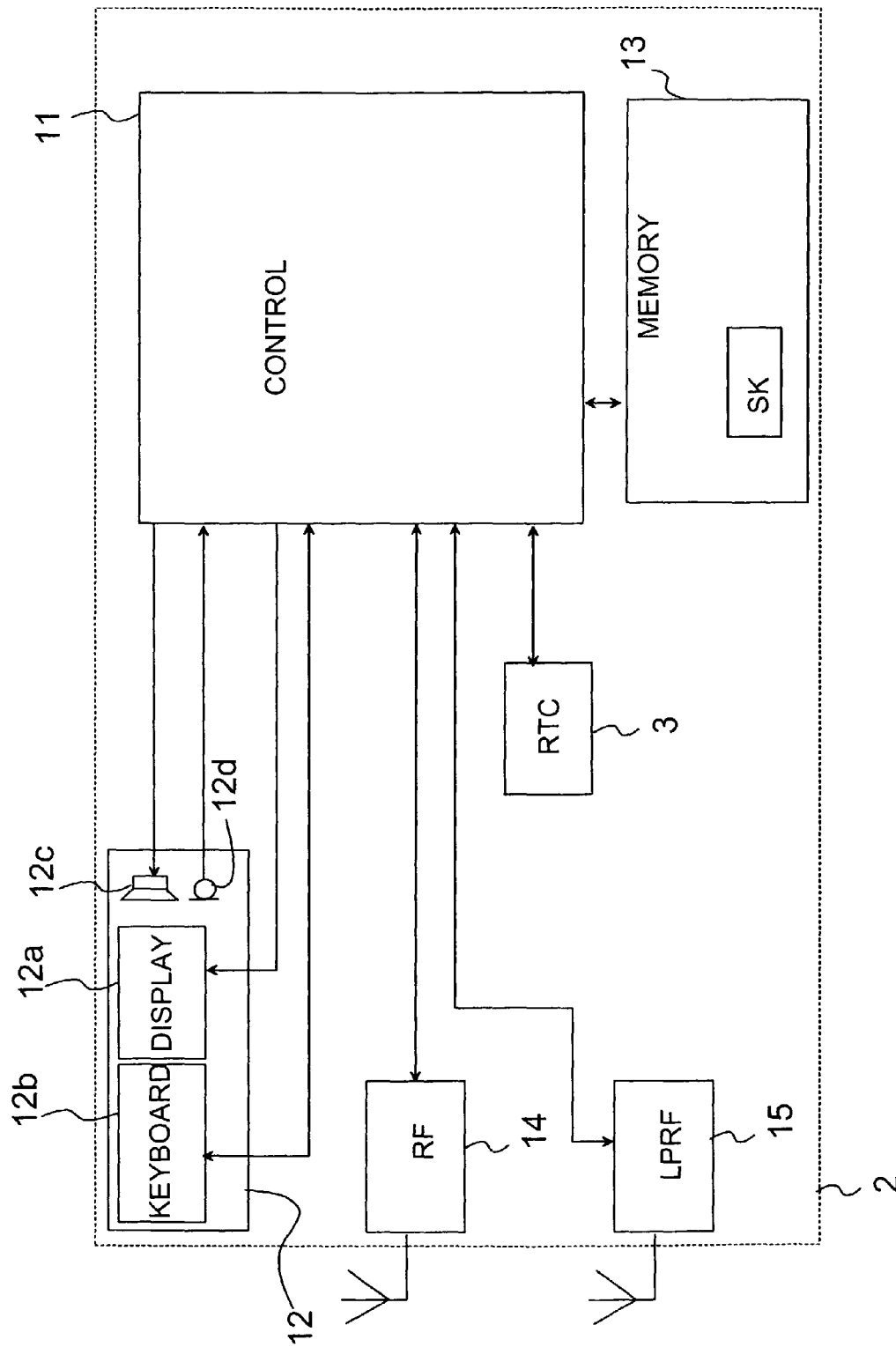
FIG. 2 shows a terminal according to a preferred embodiment of the invention in a simplified block diagram.

FIG. 2 shows the structure of a terminal 2 according to a preferred embodiment of the invention in a simplified block diagram. The terminal 2 contains a control block 11 comprising, for example, a processor, a signal processing unit, an application-specific integrated circuit, or the like. The control block 11 is arranged in connection with a real-time clock 3, wherein the control block 11 can read the time data of the real-time clock, if necessary, and set the time data, if necessary. By means of a user interface 12, it is possible to present information for the user on a display 12a, by means of a keyboard 12b the user can enter information in the terminal 2 and control the function of the terminal 2. In addition, the user interface 12 comprises audio means, such as an earpiece/speaker 12c and a microphone 12d. The terminal 2 also contains memory means 13 for storing information, such as certified time data, application programs, settings required in the function of the terminal, etc. By the communication means 14 the terminal 2 can be arranged to communicate with a communication network 4, for example, via a communication network 6 and/or local area network 5. In addition, the terminal 2 according to FIG. 2 also contains local communication means 15, such as a short-range radio transmitter/receiver, for example a Bluetooth transmitter/receiver. In this context a wireless communication device, such as a mobile phone, a communicator (for example Nokia 9290 Communicator) or a corresponding device, as well as a data processor, such as a personal computer or a portable computer can be mentioned as examples of the terminal 2. However, it should be evident that the present invention can also be applied in other electronic devices containing communication means for receiving time data and means for maintaining time data.

Figure 4:
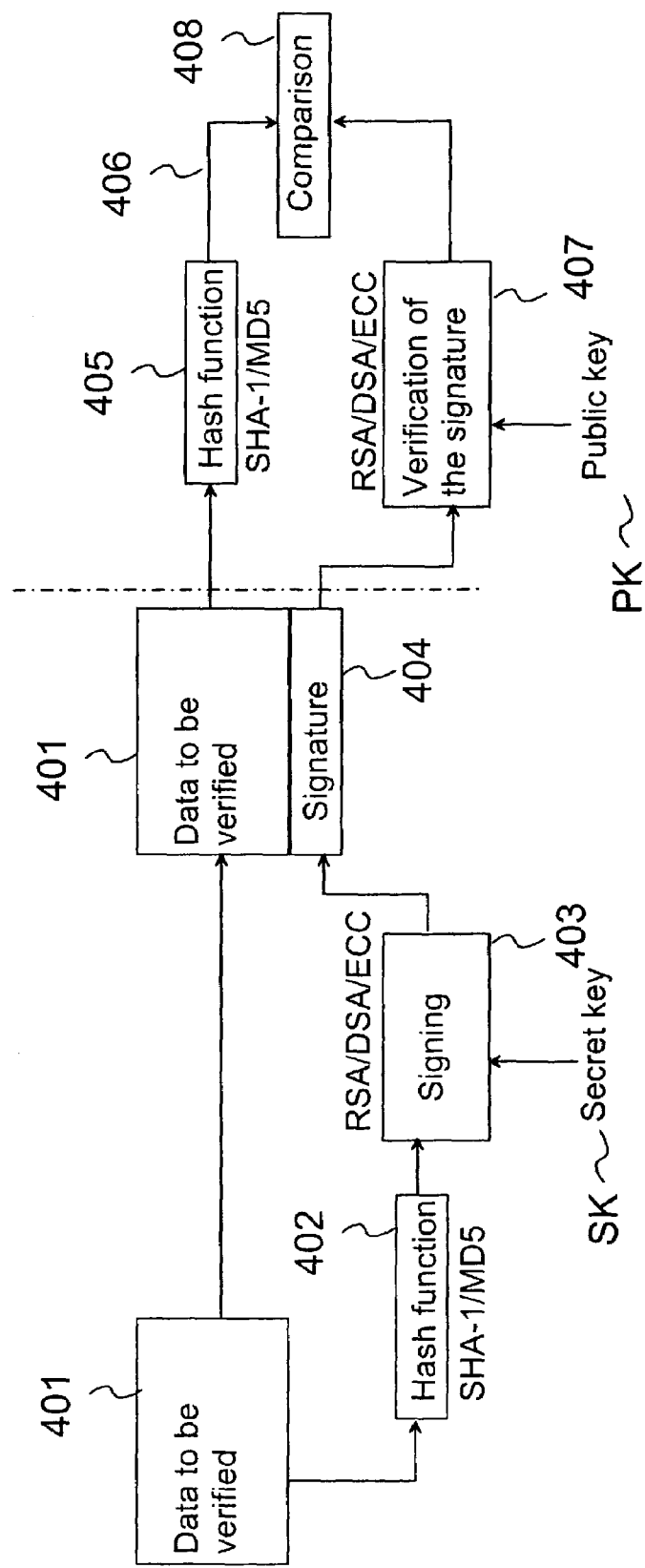
FIG. 4 shows in a reduced chart the act of applying a digital signature for verifying of time data.

In a situation in which the terminal 2 communicates with the communication network 4, certified time data can be transmitted to the terminal from the time data maintenance system 7. In the time data maintenance system 7 a clock 8 is used for maintaining time data, the verification of time data being advantageously conducted by applying a digital signature. The use of a digital signature in the production of certified time data is described as an example in the appended FIG. 4. In the digital signature typically a secret key is used for signing the data, and a public key is used for checking the authenticity of this signature. The time data 401 of the clock 8 in the time data maintenance system is advantageously transmitted to a block 402 performing a hash function (compressing function). After this, the hash data formed by the hash function is signed 403 with a secret key SK. The signature 404 is connected to the time data 401 to be signed. This time data 401 and the signature 404 connected thereto are transmitted to the communication network 4. At the receiving stage, the signature of the certified time data 404 is verified in the terminal 2 for example in the following manner. The time data is transmitted to a block 405 performing the corresponding hash function, in which block hash data 406 is produced. The signature received along with the time data can be verified 407 in such a manner that comparison data is produced by means of the public key corresponding to the signatory's secret key, which comparison data should thus correspond to the hash data produced at the signing stage, if the public key PK corresponds to the secret key SK used in the signature. This can be discovered by conducting a comparison 408 between the hash data 406 produced at the stage 405 and the information produced when verifying 407 the signature. If the data match, the signed data can be relied on with a high probability. If, however, attempts have been made to change the time data without changing the signature, it is highly unlikely that the hash data produced at stage 405 is the same as the hash data produced at stage 402, wherein the difference is detected at the comparison stage 408. If attempts have been made to change both the time data and the signature, it is unlikely that the signature decoded with the secret key produces the same result, and thus a difference is detected in the data that is being compared, and it can be assumed that the certified time data is not reliable.

In such digital signature systems, it is assumed that it is highly unlikely that the same result is obtained for two different data to be signed, when the same secret key is used. In a corresponding manner, when the signature is verified, only the correct public key can verify the authenticity of the digital signature. When the key that is used is incorrect, it is detected at the verification stage that the signature and the public key do not correspond to each other.

The certified time data is transmitted to the terminal 2 by means of the communication mechanisms of the data network 4, in which terminal the certified time data is checked advantageously in the control block 11 to ensure that the time data has not been changed and that the time data maintenance system 7 is indeed the source of the time data. For the purpose of conducting the checking stage, the public key PK corresponding to the secret key SK used for signing the time data is stored in the memory means 13 of the terminal 2. This public key PK may have been retrieved to the terminal 2 for example via the communication network 4 from the system 16 maintaining a database of the public keys PK used in verifying digital signatures. The program code of the control block 11 contains software by means of which it is possible to conduct the stages presented above in connection with the description of FIG. 4 to verify time data. If the verification of time data shows that the time data is reliable, it is stored in the memory means 13. Thereafter, when certain actions are performed it is possible to use this stored, certified time data to ensure that attempts have not been made to set the real-time clock 3 to an incorrect time.

Figure 3:
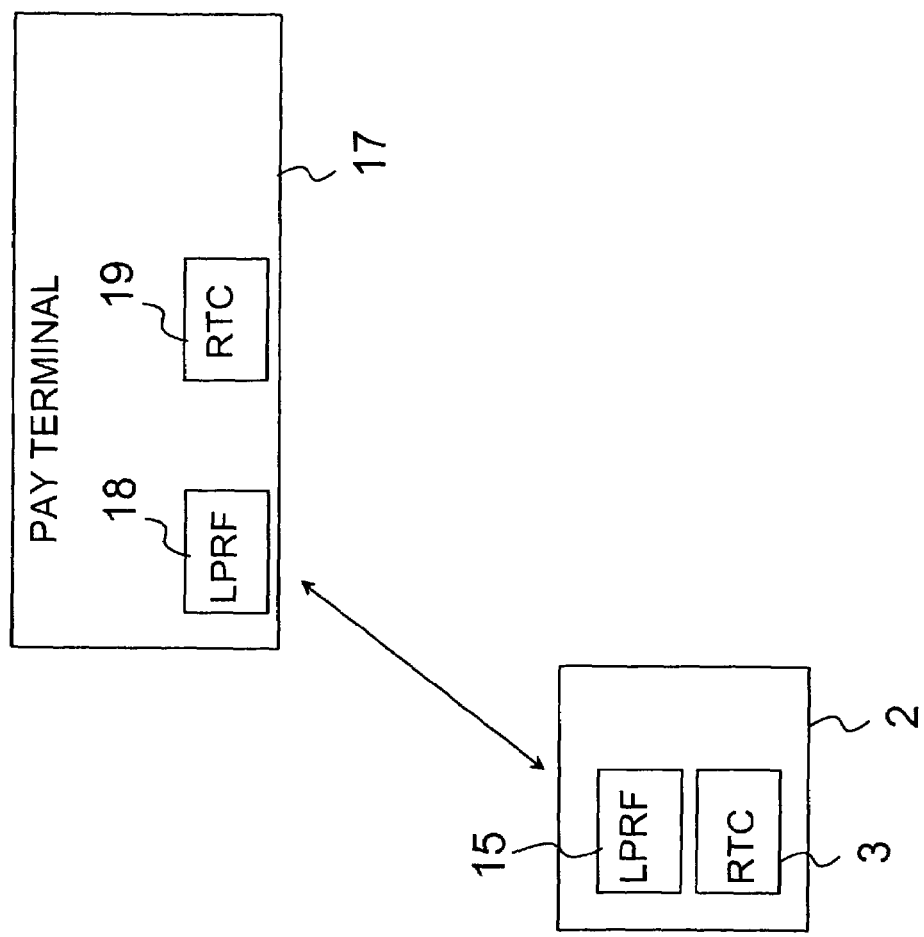
FIG. 3 shows a pay system applying the method according to a preferred embodiment of the invention.

In the following, the operation of the method according to a preferred embodiment of the invention will be described with reference to FIG. 3 in a situation in which the user of the terminal 2 conducts payment transactions via a pay terminal 17. Thus, the terminal 2 does not necessarily communicate with the communication network 4, wherein the terminal 2 utilizes the time data indicated by the real-time clock 3 of the terminal as time data. The connection between the terminal 2 and the pay terminal 17 is advantageously set up as a local wireless connection with wireless local communication means 15, 18, such as a connection according to the Bluetooth system. It is assumed that the time data that is used for determining the time of the payment transaction is maintained in the pay terminal 17. This time data can be produced either by means of a real-time clock 19 of the pay terminal 17, or it can be retrieved by means of the communication network for example from said time data maintenance system 7.

After the connection set-up between the terminal 2 and the pay terminal 17 the user of the terminal 2 for example pays bills. In connection with the payment transaction, certified time data is transmitted from the pay terminal to the terminal 2, in which it is received. Thereafter the authenticity of the received time data is advantageously verified. If the time data is proven reliable, a comparison is conducted between the certified time data received from the pay terminal and the time data of the real-time clock 10 of the terminal 2. If the time data of the real-time clock 10 is behind the certified time data, it can be assumed that the time data of the real-time clock has been changed. Thus, the terminal 2 rejects the payment transaction and advantageously transmits information thereon to the pay terminal 17. The pay terminal 17 can now for example terminate the connection and store information on such a payment attempt.

Correspondingly, in a situation in which the terminal 2 communicates with the communication network, for example with the mobile communication network 6, it is possible to retrieve certified time data to the terminal at intervals via the communication network.

In connection with the transmission of electronic documents, facsimiles, e-mails, etc. it is possible to apply the present invention in the following manner. The user selects from the terminal for example a tax form to be transmitted to the tax authority. The transmission can be conducted via e-mail, if the receiving tax authority accepts such an arrangement, or via facsimile. The tax form with the necessary enclosures is in this situation stored in the memory means 13 of the terminal in one or more files, for example in so-called pdf-format (Portable Document Format). The user activates an e-mail program and enters the address arranged for this purpose by the tax authority as the address of the receiver. As the attachments of the e-mail the user selects the tax form and one or more files used for storing the enclosures of the form. To conduct the transmission it is first checked in the terminal 2 that attempts have not been made to change the time data of the real-time clock 3. This can be conducted by applying the principle presented above in connection with the description of the embodiment of FIG. 3. If the checking shows that the time data of the real-time clock 3 is not at least behind (=earlier than) the certified time data stored in the terminal 2, it is possible to start the transmission of the e-mail. To conduct this, a data transmission connection is set up from the terminal 2 to the communication network 4, 5, 6, via which the e-mail and the attachments belonging thereto are transmitted to the receiver (not shown) in a manner known as such. If the checking shows that the time data of the real-time clock 3 is earlier than the certified time data stored in the terminal 2, the transmission of the email can be either prevented or the e-mail is supplemented with information indicating that the time data does not match, or said certified time data is set as time data.

The method according to the present invention can also be applied to prevent the evasion of expiration in times of use of music and/or video recordings, etc. by changing the time data in the real-time clock 3 of the terminal. Here, it is possible to apply the above-presented principles to a large extent. The user has, for example via a communication network 4 loaded to the terminal 2 a piece of music, a video, software or another such recording whose usage time is limited. Thus, information on the ways in which the time limit is verified has also been stored in connection with the recording. This can be conducted for example in such a manner that a fixed expiration time is determined as the time limit, or in such a manner that the time limit is determined on the basis of the first time the recording is used or loaded, wherein the recording can be used for a fixed period of time from the first usage time or time of loading onwards. When the use of such a time-restricted recording begins, it is checked in the terminal whether the recording still has usage time. This is advantageously conducted in such a manner that it is checked whether the time data of the terminal 2 is reliable by comparing it with the certified time data stored in the terminal 2. If it is discovered that the time data is reliable, the end time of the usage time is determined from the time limit information of the recording, and it is compared with the time data of the real-time clock. On the basis of this comparison either the use of the recording is started, if there still is usage time left, or the use of the recording is prevented, if the utilization time has expired. If, on the other hand, the time data was proven unreliable, it is either possible to prevent the use of the recording or use the certified time data as the time data and determine the expiration of the utilization time on the basis of this certified time data.

It is obvious that the above-presented act of examining the expiration of the utilization time can also be conducted before the reliability of the time data of the real-time clock 3 is verified. Thus, if the recording still has utilization time left, the reliability of the time data of the real-time clock 3 is checked. In a corresponding manner, if the time data of the real-time clock 3 shows that the utilization time of the recording has expired, the recording is not activated, wherein in this preferred embodiment of the invention, it is not necessary to check the reliability of the real-time clock 3 either.

Hereinabove, only some embodiment areas of the invention have been disclosed, but it should be evident that the invention can also be applied in other situations in which in the transactions performed by means of the terminal 2 it has to be possible to rely on the authenticity of the time data at an accuracy dependent on the application.

The certified time data is advantageously stored to a reprogrammable read-only memory, such as EEPROM or Flash memory. Thus, the certified time data can be used after the terminal 2 is activated, before new, certified time data is loaded to the terminal from a communication network. Typically, the real-time clock 3 is also operating when the terminal has been switched off. Thus, the real-time clock 3 obtains the necessary operating voltage either from a battery (FIG. 2) or from a voltage source, such as a battery (not shown), arranged for this purpose. If the terminal 2 is switched off for a long period of time, the voltage source of the real-time clock 3 may run down, wherein the real-time clock 3 stops. Thus, at that stage when the terminal is switched on again, the real-time clock is set either to a particular default time, or to the time last shown by the real-time clock. In some mobile stations this default time is 1.1.1980 00:00. When the terminal 2 is switched on, the time data of the real-time clock 3 is compared to the certified time data stored in the memory to find out whether the time data of the real-time clock is reliable. If the time data is proven unreliable, or if the certified time data is not stored in the terminal 2, new, certified time data is loaded to the terminal 2. In the terminal 2 according to a preferred embodiment of the invention, the time data is assumed unreliable until certified time data has been loaded in the terminal 2. By means of this arrangement it is prevented that the erroneous time data of the real-time clock 3 could be utilized for example by releasing the battery.

The functions of the method according to the invention can, to a great extent, be implemented as program codes of the control block 11. At least some of the program codes are preferably stored in such a manner that they cannot be changed or so that possible changes can be detected to prevent the user from trying to bypass the verification of time data.

It should be evident that the present invention is not limited solely to the above-presented embodiments, but it can be modified within the scope of the appended claims.

The invention claimed is:

1. Method for checking time data in a mobile terminal containing a real-time clock for maintaining time data and in which method certified time data is produced, comprising:
   storing said certified time data transmitted to the mobile terminal,
   comparing said certified time data stored in the terminal with the time data of said real-time clock prior to transmitting an electronic document from the mobile terminal to check the reliability of the time data in the real-time clock,
   considering the time data of the real-time clock unreliable if the comparison shows that the time data of the real-time clock is earlier than the certified time data, and
   rejecting the transmission of the electronic document if the comparison shows that the time data is unreliable.

2. The method according to claim 1, further comprising setting the certified time data as the time data of the real-time clock.

3. The method according to claim 1, wherein prior to the terminal transmitting an electronic document, performing said comparing to check the reliability of the time data of the real-time clock, and if the comparing and considering show that the time data in unreliable, said method further comprises the not transmitting the electronic document.

4. The method according to claim 1, further comprising determining a usage time for a music or video recording, and examining for expiration of the usage time determined for said music or video recording by using certified time data.

5. A system comprising
   a terminal with a real-time clock for maintaining time data;
   device for producing certified time data; and
   device for transmitting said certified time data to the terminal,
   device for storing said certified time data to the terminal; and
   device for comparing said certified time data with the time data of said real-time clock to check for reliability of the time data in the real-time clock;
   said terminal further comprising:
   device for checking the reliability of the time data of the real-time clock before the transmission of an electronic document;
   device for marking the time data of the real-time clock unreliable, if the comparison shows that the time data of the real-time clock is earlier than the certified time data;
   device for transmitting an electronic document from the terminal: and
   device for performing mobile station operations,
   wherein the terminal is configured to reject the transmission of the electronic document, if the time data of the real-time clock is unreliable is marked unreliable.

6. The system according to claim 5, further comprising a device for setting the certified time data as the time data of the real-time clock.

7. The system according to claim 5, wherein the electronic document is one of the following:
   telecopy,
   tax form, or
   e-mail.

8. The system according to claim 5, for use with recordings, for which usage time is determined and further comprising a device for examining the expiration of the usage time, wherein said certified time data is arranged for use in said examination of the expiration of the usage time.

9. The system according to claim 8, wherein the recording is one of the following:
   software,
   music recording, or
   video recording.

10. A terminal comprising a real-time clock for maintaining time data, and means for receiving certified time data, means for storing said certified time data and means for comparing said certified time data with the time data of said real-time clock to check the reliability of the time data in the real-time clock, said terminal further comprising a device for marking the time data of the real-time clock unreliable, if the comparison shows that the time data of the real-time clock is earlier than the certified time data, said terminal further comprising a device for transmitting an electronic document and a device for checking the reliability of the time data of the real-time clock before the transmission of the electronic document, and if the checking shows that the time data is unreliable, the electronic document is not transmitted, said terminal further comprising a device for performing mobile station operations.

11. The terminal according to claim 10, further comprising a device for setting the certified time data of the real-time clock.

* * * * *